(12) United States Patent
Ramasamy (10) Patent No.: US 10,111,045 B2
(45) Date of Patent: Oct. 23, 2018

(54) LOW POWER V2I/V2V MODE FOR MOBILE DEVICES

(71) Applicant: QUALCOMM Incorporated, San Diego, CA (US)

(72) Inventor: Bala Ramasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/192,829

(22) Filed: Jun. 24, 2016

(65) Prior Publication Data

US 2017/0374530 A1 Dec. 28, 2017

(51) Int. Cl.
*H04W 4/02* (2018.01)
*G01C 21/20* (2006.01)
(Continued)

(52) U.S. Cl.
CPC .............. *H04W 4/04* (2013.01); *G01C 21/26* (2013.01); *G01C 21/28* (2013.01); *G01C 21/30* (2013.01); *G01C 21/34* (2013.01); *G01C 21/343* (2013.01); *G01C 21/3407* (2013.01); *G01C 21/3423* (2013.01); *G01C 21/3492* (2013.01); *G01C 21/3605* (2013.01); *G01C 21/3691* (2013.01); *G05D 1/02* (2013.01); *G07B 15/00* (2013.01); *G07B 15/063* (2013.01); *G08G 1/00* (2013.01); *G08G 1/065* (2013.01); *G08G 1/091* (2013.01);
(Continued)

(58) Field of Classification Search
CPC ........ G01C 21/34; G01C 21/26; G01C 21/30; G01C 21/3423; G01C 21/343; G01C 21/3492; G01C 21/3605; G01C 21/3691; G08G 1/09; G08G 1/164; G08G 1/09675; G08G 1/161; G08G 1/093; G08G 1/091; G08G 1/096827; G08G 1/00; H04W 4/02; H04W 4/021; H04W 4/023; H04W 4/027; H04W 4/029; H04W 4/04; H04L 43/06; H04M 1/72536; G07B 15/063
See application file for complete search history.

(56) References Cited

U.S. PATENT DOCUMENTS 5,541,845 A * 7/1996 Klein ................... G01C 21/343
340/988
6,516,285 B1 2/2003 Hori et al.
(Continued)

FOREIGN PATENT DOCUMENTS

| CN | 105280005 A | 1/2016 |
| WO | 2013112565 A1 | 8/2013 |
| WO | 2015184962 A1 | 12/2015 |

OTHER PUBLICATIONS

International Search Report and Written Opinion—PCT/US2017/030238—ISA/EPO—dated Sep. 5, 2017.

*Primary Examiner* — Nizar N Sivji (74) *Attorney, Agent, or Firm* — Arent Fox, LLP and Qualcomm, Incorporated (57) ABSTRACT

A method, an apparatus, and a computer-readable medium for wireless communication are provided. In one aspect, an apparatus may be configured to obtain location information associated with the apparatus. The apparatus may be configured to determine routing information from the apparatus to a geographical area based on the obtained location information. The apparatus may be configured to adjust a periodicity for safety reporting based on the determined routing information.

27 Claims, 6 Drawing Sheets

(51) Int. Cl.

| | | |
|---|---|---|
| H04W 4/04 | (2009.01) | |
| H04L 12/26 | (2006.01) | |
| H04W 4/12 | (2009.01) | |
| G01C 21/26 | (2006.01) | |
| G01C 21/30 | (2006.01) | |
| G01C 21/34 | (2006.01) | |
| G01C 21/36 | (2006.01) | |
| G08G 1/00 | (2006.01) | |
| G08G 1/065 | (2006.01) | |
| G08G 1/09 | (2006.01) | |
| G07B 15/06 | (2011.01) | |
| H04W 4/021 | (2018.01) | |
| H04W 4/20 | (2018.01) | |
| H04L 12/825 | (2013.01) | |
| H04W 4/029 | (2018.01) | |
| G01C 21/28 | (2006.01) | |
| G05D 1/02 | (2006.01) | |
| G07B 15/00 | (2011.01) | |
| H04W 88/02 | (2009.01) | |
| G08G 1/16 | (2006.01) | |

(52) U.S. Cl.
CPC .......... *G08G 1/205* (2013.01); *G08G 1/207* (2013.01); *H04L 43/06* (2013.01); *H04L 47/25* (2013.01); *H04W 4/02* (2013.01); *H04W 4/021* (2013.01); *H04W 4/023* (2013.01); *H04W 4/027* (2013.01); *H04W 4/029* (2018.02); *H04W 4/046* (2013.01); *H04W 4/12* (2013.01); *H04W 4/20* (2013.01); *G08G 1/163* (2013.01); *H04W 88/02* (2013.01); *Y02D 70/00* (2018.01)

(56) References Cited

U.S. PATENT DOCUMENTS

| | | | |
|---|---|---|---|
| 6,985,696 B2 | 1/2006 | Bromham et al. | |
| 8,600,411 B2 | 12/2013 | Subramanian et al. | |
| 8,730,066 B2 | 5/2014 | Malarky | |
| 9,048,960 B2 | 6/2015 | Li et al. | |
| 2005/0221759 A1* | 10/2005 | Spadafora | G08G 1/09 455/41.2 |
| 2007/0164896 A1* | 7/2007 | Suzuki | G01S 7/006 342/70 |
| 2008/0082253 A1* | 4/2008 | Oguchi | G01C 21/3461 701/533 |
| 2009/0248292 A1* | 10/2009 | Adachi | G01C 21/26 701/533 |
| 2011/0210866 A1* | 9/2011 | David | G08G 1/166 340/903 |
| 2014/0114573 A1* | 4/2014 | Ettinger | G01C 21/3641 701/533 |
| 2015/0035685 A1* | 2/2015 | Strickland | B60Q 9/008 340/901 |
| 2016/0097649 A1* | 4/2016 | Broadbent | G01C 21/3691 701/426 |
| 2016/0216130 A1* | 7/2016 | Abramson | G01C 21/3626 |

\* cited by examiner

LOW POWER V2I/V2V MODE FOR MOBILE DEVICES

BACKGROUND

Field

The present disclosure relates generally to communication systems, and more particularly, to low power vehicle-to-infrastructure (V2I) and/or vehicle-to-vehicle (V2V) mode for mobile devices.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims, which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station) for wireless communication. The apparatus may be configured to obtain location information associated with the apparatus. The apparatus may be configured to determine a proximity of the apparatus to a geographical area based on the obtained location information and adjust a periodicity for safety reporting based on the determined proximity of the apparatus to the geographical area.

DETAILED DESCRIPTION

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method, which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices, which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
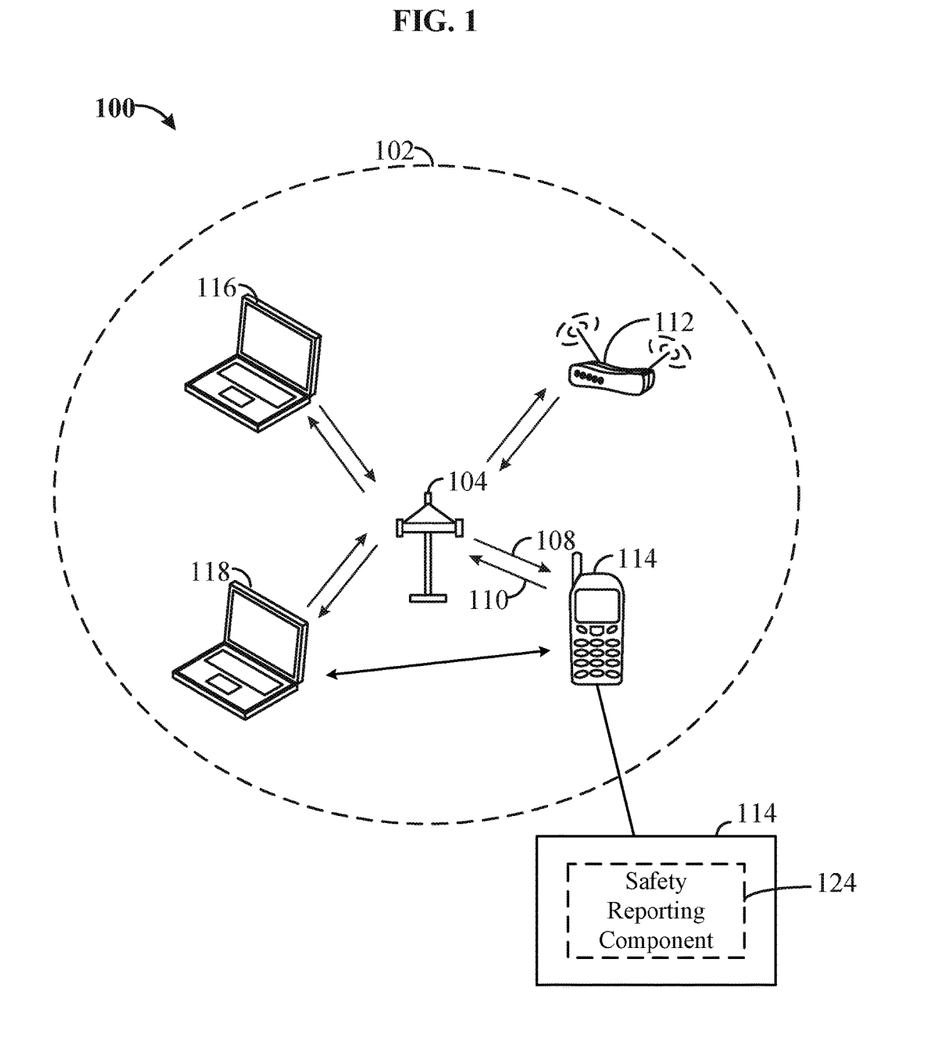
FIG. 1 shows an example wireless communication system in which aspects of the present disclosure may be employed.

FIG. 1 shows an example wireless communication system 100 in which aspects of the present disclosure may be employed. The wireless communication system 100 may operate pursuant to a wireless standard, for example the 802.11 standard. The wireless communication system 100 may also be associated with a cellular network (e.g., a long term evolution (LTE) network). The wireless communication system 100 may include an AP 104, which communicates with STAs (e.g., STAs 112, 114, 116, and 118).

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., the AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., the STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may include one or more components for safety reporting. For example, the STA 114 may include a safety reporting component 124. The STA 114 may be configured to obtain location information associated with the STA 114. The STA 114 may be configured to determine routing information from the STA 114 to a geographical area based on the obtained location information. The STA 114 may be configured to adjust a periodicity for safety reporting based on the determined routing information.

Wireless devices may periodically report safety information (e.g., vehicular safety information) to nearby wireless devices to enhance safety. In an example, safety reporting may be implemented using dedicated short-rage communications (DSRC), which includes one-way or two-way short to medium range wireless communication channels designed for automotive use. The IEEE 802.11p standard, for example, has been proposed for DSRC. The 802.11p standard provides 7 channels of 10 megahertz (MHz) each in the 5.9 gigahertz (GHz) spectrum reserved for periodically broadcasting basic safety messages that indicate a device's position, velocity, current operating status, and other attributes/information to avoid collision, improve traffic flow, etc.

Frequent transmissions for safety information reporting may excessively drain battery power of a wireless device, especially when the wireless device is not within proximity of a vehicle and/or a geographical area where a vehicle may be located. Further, frequent transmission may also lead to medium congestion with little to no benefit if a large number of wireless devices transmit basic safety messages when the wireless device is not close to a road or to traffic. As such, a need exists to improve the methods and techniques by which basic safety messages are reported.

Figure 2:
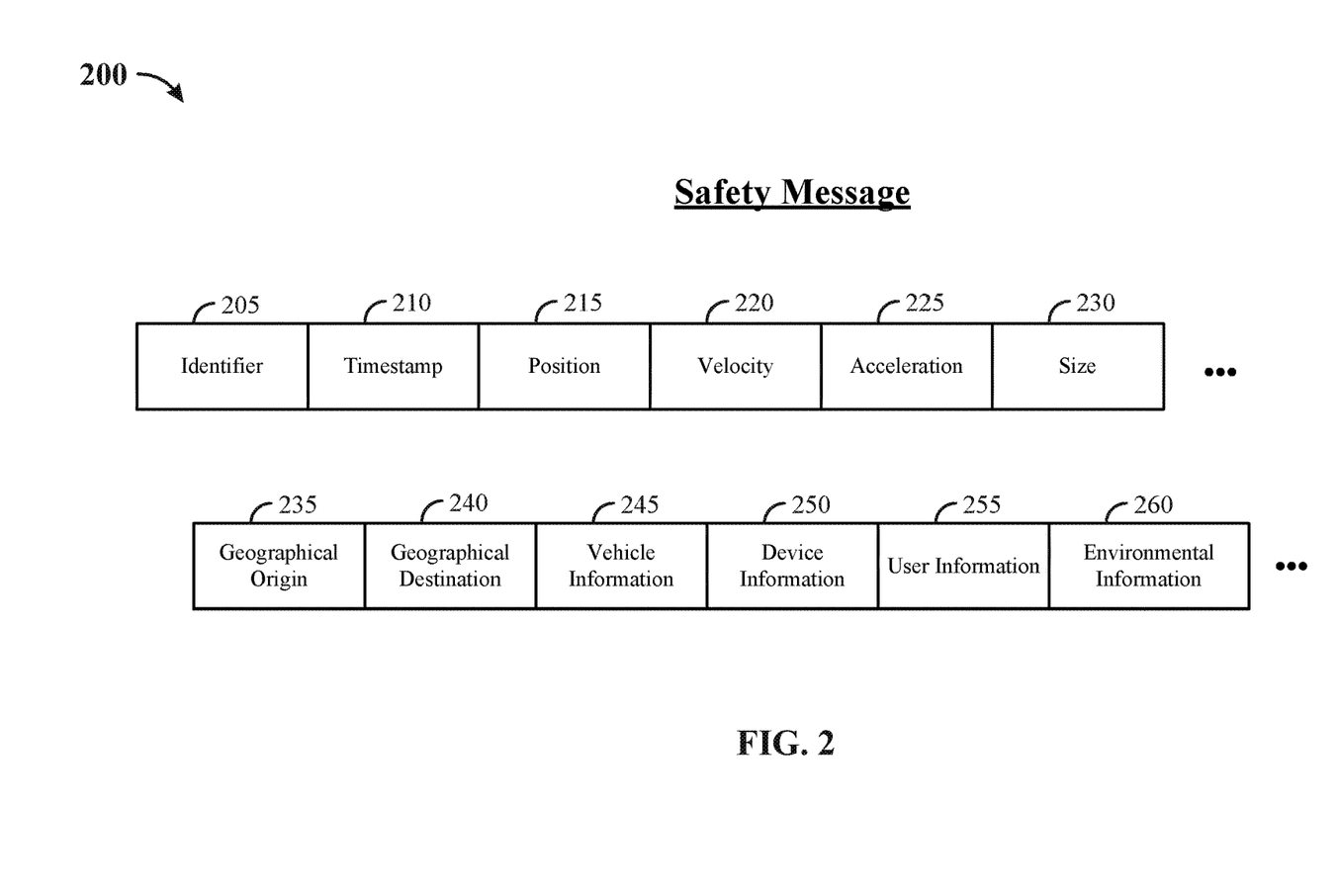
FIG. 2 illustrates an exemplary diagram of a safety message.

FIG. 2 illustrates an exemplary diagram 200 of a safety message. In one aspect, the safety message may be a basic safety message intended for transmission using DSRC (e.g., using the IEEE 802.11p standard). In another aspect, the safety message may include one or more fields indicated in FIG. 2, and may have other fields not indicated in FIG. 2. For example, an identifier field 205 may include information that identifies the sender of the safety message. The identifier field may include a medium access control of the wireless device transmitting the safety message. In the alternative, or in addition, the identifier field may include a string value that identifies the name of the sender or the wireless device. A timestamp field 210 may indicate a time at which the safety message was sent. A position field 215 may indicate a position of the wireless device (e.g., longitude, latitude, and/or elevation). A velocity field 220 may indicate a speed and direction at which the wireless device is traveling, and an acceleration field 225 may indicate the acceleration, if any, with respect to the wireless device. A size field 230 may indicate an approximate size (e.g., height, weight, and/or approximate perimeter or circumference) of the wireless device. A geographical origin field 235 may indicate where the wireless device's last stationary position or starting point of travel. A geographical destination 240 field may indicate a location to where the wireless device is headed. If the wireless device is associated with a vehicle, the safety message may include a vehicle information field 245 that may indicate brake system status, recent braking, vehicle type, vehicle description, lights status, wiper status, brake level, etc. In an aspect, the vehicle information field 245 may include capability information such as whether the vehicle has an anti-lock braking system, stability control, cruise control, rear-backup camera, etc. A device information field 250 may include information associated with the wireless device reporting the safety messages. The wireless device may be a vehicle or a STA. In an aspect, the device information field 250 may indicate a battery level, supported communication protocols (e.g., Bluetooth, WLAN, WAN, etc.), available channels and/or frequency bands for further communication on the supported communication protocols, a maximum modulation and coding scheme (MCS) index, a number of transmit antennas, a number of receive antennas, a number of spatial streams, etc. In another aspect, the safety message may include a user information field 255 related to the user of the wireless device. The user information may indicate a user age, user disability information (e.g., whether the user is blind, has limited vision, requires a wheelchair or a cane, is hearing impaired, etc.). An environmental information field 260 may indicate weather information (e.g., rain, snow), road conditions (e.g., dry, wet, icy), air temperature, air pressure, coefficient of friction, etc.

Figure 3:
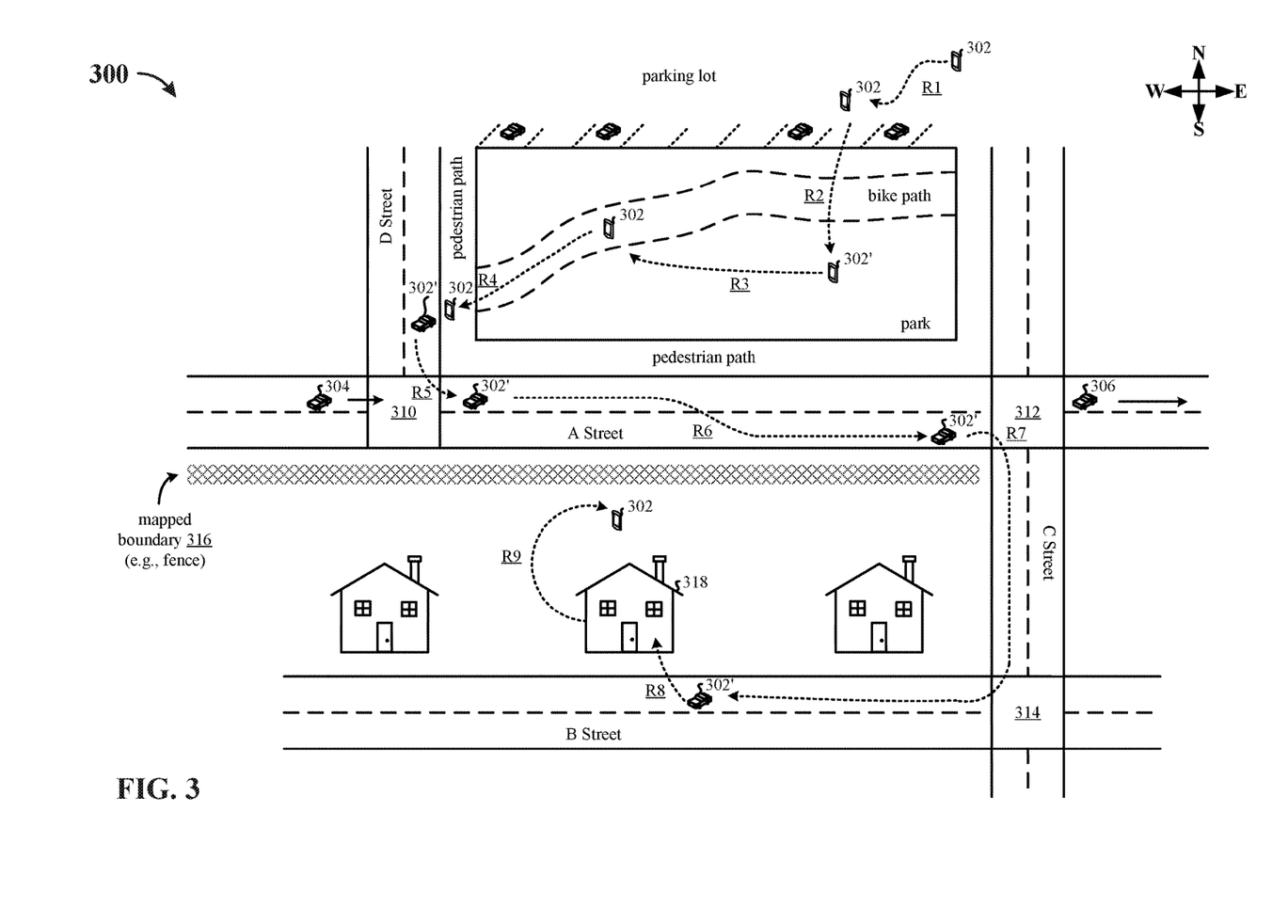
FIG. 3 is a diagram illustrating a method for adjusting the periodicity of safety message reporting (e.g., DSRC reporting).

FIG. 3 is a diagram 300 illustrating a method for adjusting the periodicity of safety message reporting (e.g., DSRC reporting). Wireless devices, such as a STA 302, may periodically broadcast safety messages (e.g., basic safety messages using DSRC). The periodicity with which the safety message is reported may depend on a route from the STA 302, for example, to a geographical area and the type of geographical area.

Referring to FIG. 3, the STA 302 may obtain location information for the STA 302. In one aspect, the location information may include coordinates of the STA 302 (e.g., longitude and latitude). The location information may further include height information (e.g., height or elevation of the STA 302 relative to sea level). In another aspect, the location information may be a dispatchable location such as a venue or an address. In another aspect, the STA 302 may receive the location information from an AP or a WAN base station (e.g., a nodeB or eNodeB). In another aspect, the STA 302 may determine the location information using a global navigation satellite system (GNSS), wireless wide area network (WWAN), WLAN, Bluetooth sensors, near-field communications (NFC), radio frequency identification (RFID), or any combination thereof.

Initially, the STA 302 may be configured to report safety messages at a first periodicity (e.g., once every 100 ms). As the STA 302 moves along route 1 (R1), and along the various other routes, the STA 302 may adjust the periodicity based on route information with respect to different geographical areas. For example, the STA 302 may determine whether the STA 302 is within a proximity of and/or within one or more geographical areas. Geographical areas may include a vehicular road, a parking lot, a bicycle path, a pedestrian path, a park, a building, a street intersection, or other areas.

In an aspect, the STA 302 may identify the geographical areas based on geo-fencing, which is a feature that uses GNSS (or WWAN, WLAN, NFC) to define geographical boundaries. Geographical boundaries may include natural geographical boundaries (e.g., rivers, streams, etc.) and man-made boundaries (e.g., roads, fences, walls, etc.). A geo-fence may represent a virtual barrier. In an example, if the STA 302 has a map of the surroundings, the STA 302 may use GNSS signals to determine where the STA 302 is located within the surroundings, including whether the STA 302 is located within a geographical area or within a proximity of the geographical area but not inside of the geographical area. If the STA is within a proximity of the geographical area, the STA 302 may determine a route to the geographical area based on the determined location of the STA 302 and the mapped boundaries and routes indicated in the map. The mapped boundaries may include physical barriers to pedestrian traffic (e.g., a wall, fence, body of water, etc.), and the mapped routes may include roads, street, paths, etc. In an aspect, the map may be preconfigured within the STA 302 or received from a network entity (e.g., an AP or another STA). As further discussed below, when the STA 302 enters (or exits) the defined boundaries of a geographical area, an indication may be provided to or within the STA 302 based on the geo-fencing, and the indication may trigger a rate adjustment for safety message reporting.

Referring to FIG. 3, a geo-fencing perimeter may be setup around a parking lot and the STA 302 may move along R1 and arrive at the parking lot. Based on the geo-fencing boundaries, the STA 302 may determine that the STA 302 is within the boundaries of the parking lot or close to the boundaries of the parking lot. In an aspect, if the STA 302 is located within the parking lot, the STA 302 may increase the periodicity of safety message reporting because the parking lot may be expected to have a greater number of vehicles.

Subsequently, the STA 302 may exit the parking lot by moving along route 2 (R2) and enter a park. The STA 302 may determine that the STA 302 is within the park based on geo-fencing. In one example, sensors may be equipped throughout the park to delineate the boundaries of the park and to provide a notification to the STA 302 when the STA 302 has entered the park. In another example, the STA 302 may determine that the STA 302 is within the park based on obtained location information of the STA 302 with reference to an area map. Because the STA 302 is within the park, which may have little vehicular traffic, the STA 302 may reduce the periodicity for safety message reporting.

The STA 302 may move along route 3 (R3) and enter a bicycle path within the park. The STA 302 may determine that the STA 302 is within a bicycle path based on geo-fenced boundaries, for example. Although the bicycle path is within the park, the bicycle path may include bicyclists moving at different and rapid speeds. The STA 302 may increase the periodicity of the safety message reporting based on the determination that the STA 302 has entered a bicycle path. As such, when the STA 302 is within multiple geographical areas, the STA 302 may increase the periodicity if at least one of the geographical areas is associated with an increased rate of safety message reporting, even if the remaining geographical areas are associated with a decreased rate of safety message reporting.

Subsequently, the STA 302 may traverse route 4 (R4). At the end of R4, the STA 302 may arrive at a pedestrian path adjacent to D street, which is a vehicular road. Based on the geo-fenced boundaries, the STA 302 may determine that it is outside of the bike path and within a pedestrian path that is adjacent to D street. Due to the proximity of the STA 302 to D street, which may have a greater likelihood of vehicular traffic, the STA 302 may determine to increase the periodicity of safety message reporting. In aspect, the STA 302 may further adjust the periodicity of the reporting based on a number of vehicles located within a distance of D street. For example, when the STA 302 determines that the STA 302 is adjacent to D street, the STA 302 may compute a number of safety messages received from vehicles traveling on D street. The number of safety messages provides an indication of the number of vehicles on D street. A higher number suggests more vehicles on D street, and a lower number suggests fewer vehicles on D street. When there are more vehicles (e.g., received safety messages greater than a threshold), the reporting periodicity may be increased to a second threshold, whereas if there are less vehicles (e.g., received safety messages greater than a threshold), the reporting periodicity may be increased to a third threshold, and the third threshold may be less than the second threshold. In another aspect, a time of day and/or a time of year may affect the number of vehicles in a road. During rush hour (e.g., between 7 AM and 10 AM, and between 4 PM to 7 PM, for example), the roads are more likely to have a greater amount of a traffic than during non-rush hour. Similarly, the roads may have more traffic outside of the holidays than during the holidays. The STA 302 may increase the reporting rate during rush hour and non-holidays. As such, when the STA 302 is near D street, the STA 302 may further adjust the reporting periodicity based on a time of day and/or a time of year. In another aspect, the STA 302 may consider a saturation number in adjusting the reporting periodicity. The saturation number may correspond to a number of vehicles that are capable of DSRC reporting within a geographical region. The saturation number may be determined based on sales figures of DSRC components or DSRC capable vehicles in the area, registration information, surveys, etc. Based on the historical rate of vehicles on the road at a particular time of day, the number of DSRC messages, and the saturation number, the STA 302 may determine how to adjust the DSRC reporting. For example, even if the absolute number of DSRC messages is not above a first threshold, but the ratio of the DSRC messages to the saturation number is above a second threshold and the historical rate of vehicles on the road is high, then the STA 302 may determine to increase the DSRC reporting periodicity. By contrast, if the absolute number of DSRC messages is not above the first threshold, the ratio of DSRC messages to the saturation number is below the second threshold, and the historical rate of vehicles on the road is low, then the STA 302 may determine either decrease or maintain the DSRC reporting periodicity.

Referring to FIG. 3, the user of the STA 302 may enter a first vehicle 302', and the STA 302 may be located within the first vehicle 302'. The first vehicle 302' may travel south on D street. In an aspect, the user may input a destination of where the user is going upon entering the first vehicle 302'. For example, the destination may be the address of the user's home 318.

After entering the first vehicle 302', the STA 302 may estimate an expected route of the STA 302 based on the user inputted destination and the boundaries and/or roads provided by the map. The estimated route may indicate a path from the starting point to the destination. Using the path, the STA 302 may estimate whether the STA 302 may be within a proximity threshold of one or more geographical areas as the STA 302 moves along the path. The STA 302 may determine a schedule that identifies when the STA 302 may be within a proximity threshold of the one or more graphical areas. Subsequently, the STA 302 may adjust the safety reporting periodicity based on the determined schedule. For example, if the STA 302 begins the route at 3:00 PM and expects to be within a proximity threshold of two geographical areas associated with higher safety reporting periodicities at 3:10 PM and at 3:30 PM, then the STA 302 may increase the safety reporting periodicity to a second periodicity at 3:10 PM and at 3:30 PM, and reduce the safety reporting periodicity to a first periodicity at the remaining times. In other words, the STA 302 may determine a schedule for adjusting the safety reporting periodicity based on the routing information.

In an aspect, the STA 302 may communicate with any onboard systems (e.g., a computer) of first vehicle 302', even if first vehicle 302' does not have DSRC capabilities to determine whether the STA 302 is in first vehicle 302'. If first vehicle 302' has DSRC capabilities, then the DSRC reporting of the STA 302 may be temporarily disabled until the STA 302 exits the first vehicle 302'. In another aspect, the STA 302 may use other methods for determining whether it should handle DSRC communications on the vehicle's behalf (e.g., determining that the STA 302 is in a vehicle based on the speed of travel). In another aspect, the DSRC reporting rate may be adjusted if the STA 302 is approaching a particular geographical area that is associated with a higher rate of accident (e.g., intersections that have high accident rates). In another aspect, the DSRC reporting rate may be associated with different paths, and the paths may include vehicular paths and pedestrian paths.

Referring to FIG. 3, the estimated route for the STA 302 to reach the destination may include routes 5, 6, and 7 (R5, R6, R7). Along the routes, the STA 302 may identify geographical areas that the STA 302 may be within a proximity threshold based on a stored map. The geographical areas may include D street, a first intersection 310, A street, a second intersection 312, C street, a third intersection 314, and B street. The STA 302 may determine a schedule for when the STA 302 may be within the geographical areas and adjust the safety message reporting based on the determined schedule.

As the STA 302 travels south on D street, the STA 302 may approach the first intersection 310 and receive safety message reports from a second vehicle 304 traveling east on A street and also approaching the first intersection 310. In an aspect, the safety message from the second vehicle 304 may include a location, heading, and speed of the second vehicle 304. Because the second vehicle 304 is traveling at a direction that is not parallel with the direction of travel of the STA 302, the STA 302 may be configured to increase a safety reporting periodicity based on the proximity of the second vehicle 304 and the directions of travel of both the STA 302 and the second vehicle 304.

Subsequently, the first vehicle 302' may continue on R5, turning left at the first intersection 310 onto A street. After entering A street, the STA 302 may reduce the reporting periodicity because there are no vehicles approaching the STA 302 in a non-parallel direction. The STA 302 may determine not to disable the safety reporting because the STA 302 is still traveling on a road. In an aspect, the STA 302 may also determine that the STA 302 is close to a pedestrian path that is parallel to the A street but not within the pedestrian path. Due to the directionality of the STA 302 (e.g., heading east), the STA 302 may determine that the direction of travel of the STA 302 may not cause the STA 302 to intersect with the pedestrian path because the STA 302 is moving in a direction that is parallel to the pedestrian path. Accordingly, the STA 302 may not adjust the safety reporting periodicity based on the pedestrian path and the directionality of the STA 302.

The STA 302 may continue to travel east on A street along R6 and approach the second intersection 312. The STA 302 may continue to adjust the reporting periodicity based on the determined schedule. As the STA 302 approaches the second intersection 312, the STA 302 may determine that a third vehicle 306 is nearby the second intersection 312 based on safety messages received from the third vehicle 306. The STA 302 may determine that the third vehicle 306 is traveling in the same direction as the STA 302 and at a speed which would not enable the STA 302 to catch up to the third vehicle 306 before the STA 302 is expected to turn right at the second intersection 312 according to the estimated route. The STA 302 may not adjust the periodicity of the safety reporting based on the directionality and speed of the third vehicle 306 and on the estimated route of the STA 302. As such, the periodicity may be adjusted based on a combination of an estimated route and a location, velocity, and/or acceleration of other objects.

Upon turning right at the second intersection 312, the first vehicle 302' may follow R7, heading south onto C street, approach the third intersection 314, and turn right at the third intersection 314 onto B street. Along R7, the STA 302 may be traversing roads and approaching intersections. The time of day when the STA 302 travels along R7 may be after rush hour. In an aspect, the STA 302 may also determine that it has not received any safety messages from other devices, and therefore, determine that no other vehicles are nearby. Based on the time of day and/or the amount of traffic, the STA 302 may determine to reduce the safety reporting periodicity.

After traveling R7, the first vehicle 302' may approach the user's home 318. The STA 302 may exit the first vehicle 302', travel along route 8 (R8) and enter the user's home 318. In an aspect, the STA 302 may periodically obtain its location information. For example, the STA 302 may obtain the location information for the STA 302 and determine that the STA 302 has entered the user's home 318 based on geo-fencing (e.g., GNSS and mapping). Upon determining the STA 302 is within a building, the STA 302 may disable the safety message reporting.

Subsequently, the STA 302 may follow route 9 (R9) and exit the user's home 318 and into a backyard of the user's home 318. At the backyard, the STA 302 is close to A street, in terms of absolute distance (assuming no physical barriers), but cannot enter A street because a mapped boundary 316. The mapped boundary 316 may be a physical barrier to pedestrian traffic, such as a fence or a wall, that separates the STA 302 and A street. For example, the STA 302 may obtain location information associated with the STA 302. The location information may indicate a position of the STA 302. The STA 302 may detect a presence of A street within a distance threshold based on geo-fencing. The STA 302 may estimate a route from the current position of the STA 302 to A street based on the mapped boundary 316. The STA 302 may determine that the STA 302 may not cross the mapped boundary 316 because the boundary is a physical barrier. In another aspect, even if the map does not indicate a mapped boundary, the STA 302 may determine that a physical barrier exists due to historically traversed routes of the STA 302 or other devices. The historical routes may be stored at the STA 302 or provided by another network device. To reach A street, the STA 302 may determine that the STA 302 will need to traverse an estimated route that includes R9, R8, and R7. In one aspect, the STA 302 may determine the combined distance of R9, R8, and R7. If the combine distance is greater than a distance threshold (e.g., 2000 feet), the STA 302 may not be within close proximity to A street even though the absolute distance between the STA 302 and A street may be under the distance threshold. Accordingly, the STA 302 may not increase the safety reporting periodicity or enable safety reporting even if the STA 302 is within an absolute distance of a geographical area if, based on the estimated route, the STA 302 is beyond a distance threshold to the geographical area.

In another aspect, instead of utilizing the distance threshold, the STA 302 may utilize a travel time threshold. For example, the travel time for the combined routes R9, R8, and R7 may be greater than a travel time threshold (e.g., 10 minutes). If the travel time for the STA 302 to reach A street via the estimated route is greater than the travel time threshold, then the STA 302 may determine that the STA 302 is not within a proximity threshold of A street. Accordingly, the STA 302 may not increase the safety reporting periodicity or enable safety reporting when the STA 302 is close to a geographical area with high vehicular traffic if, based on the estimated route, the STA 302 is beyond a travel time threshold to the geographical area.

In another aspect, the estimated route may also be based on a height separation between the STA 302 and the geographical area. For example, the STA 302 may be situated up on the edge of a hill that is adjacent to a busy street. As such, based on longitude and latitude, the STA 302 may be close to the road. However, the STA 302 may be hundreds of feet above the road, and therefore, the STA 302 may not increase safety reporting periodicity due to the height separation between the STA 302 and the road.

In an another aspect, the STA 302 may adjust the safety reporting periodicity based on a rate table. The rate table may enumerate one or more geographical areas (e.g., a park, pedestrian path, residential street, highway, etc.), and each of the one or more geographical areas may be associated with a reporting periodicity. Once the STA 302 is determined to be within a particular geographical area, the STA 302 may adjust the reporting periodicity based on the rate table. If the STA 302 is within multiple geographical areas, the STA 302 may select the highest reporting periodicity among the multiple geographical areas. In this aspect, the rate table may be preconfigured at the STA 302 or received from a network entity.

Figure 4:
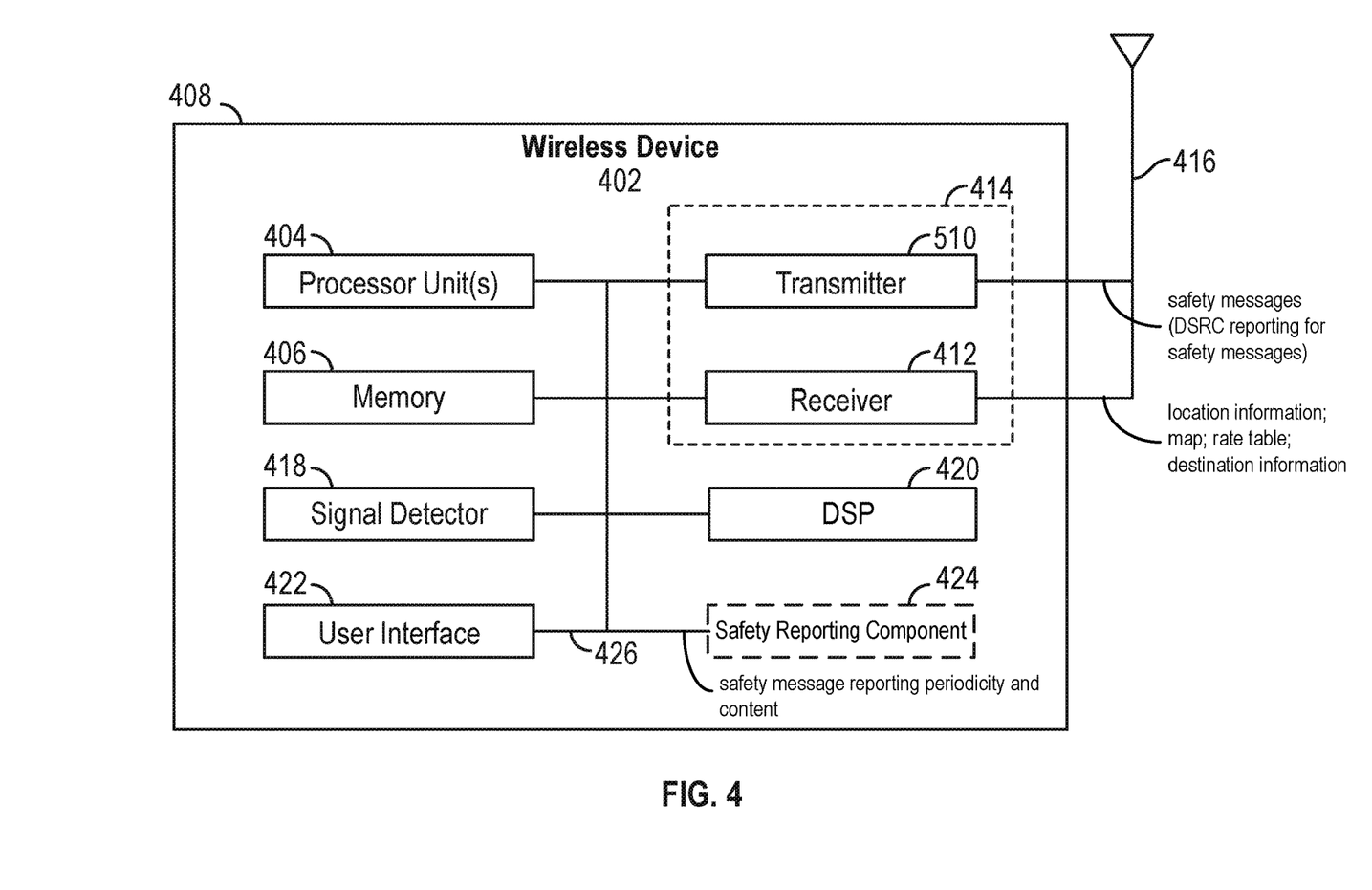
FIG. 4 shows an example functional block diagram of a wireless device that adjusts a safety message reporting periodicity within the wireless communication system of FIG. 1.

FIG. 4 shows an example functional block diagram of a wireless device 402 that adjusts a safety message reporting periodicity within the wireless communication system 100 of FIG. 1. The wireless device 402 is an example of a device that may be configured to implement the various methods described herein. For example, the wireless device 402 may comprise one of the STAs 114, 302.

The wireless device 402 may include a processor 404, which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable (by the processor 404, for example) to implement the methods described herein.

The processor 404 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may include an interface configured to provide information for transmission by the transmitter 410 and/or the transceiver 414. The interface may also be configured to receive information from the receiver 412 and/or the transceiver 414. In an aspect, the interface may be an interface of the processor 404.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408, and the wireless device 402 that may include a transmitter 410 and/or a receiver 412 to allow transmission and reception of data between the wireless device 402 and a remote device. The transmitter 410 and the receiver 412 may be combined into a transceiver 414. An antenna 416 may be attached to the housing 408 and electrically coupled to the transceiver 414. The wireless device 402 may also include multiple transmitters, multiple receivers, multiple transceivers, and/or multiple antennas.

The wireless device 402 may also include a signal detector 418 that may be used to detect and quantify the level of signals received by the transceiver 414 or the receiver 412. The signal detector 418 may detect such signals as total energy, energy per subcarrier per symbol, power spectral density, and other signals. The wireless device 402 may also include a DSP 420 for use in processing signals. The DSP 420 may be configured to generate a packet for transmission. In some aspects, the packet may comprise a physical layer convergence procedure (PLCP) protocol data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

When the wireless device 402 is implemented as a STA (e.g., the STA 114), the wireless device 402 may also comprise a safety reporting component 424. The safety reporting component 424 may be configured to obtain location information associated with the wireless device 402. The safety reporting component 424 may be configured to determine routing information from the wireless device 402 to a geographical area based on the obtained location information. The safety reporting component 424 may be configured to adjust a periodicity for safety reporting based on the determined routing information. In an aspect, the geographical area may be a vehicular road, a parking lot, a bicycle path, a pedestrian path, a park, an intersection, or a building. In one configuration, the safety reporting component 424 may be configured to determine the routing information by estimating a route from the wireless device 402 to the geographical area based on mapped geographical boundaries and by determining a distance to or a time to travel to the geographical area based the estimated route. In this configuration, the periodicity may be adjusted based on the distance associated with the estimated route or the time to travel associated with the estimated route. In another configuration, the safety reporting component 424 may be configured to determine the routing information by identifying physical barriers to pedestrian traffic based on the mapped geographical boundaries. The route may be estimated based on the identified physical barriers to pedestrian traffic, and the periodicity may be adjusted based on the identified physical barriers to pedestrian traffic. In another configuration, the safety reporting component 424 may be configured to receive the mapped geographical boundaries from another apparatus. In another configuration, the safety reporting component 424 may be configured to receive destination information. In this configuration, the safety reporting component 424 may be configured to determine the routing information by estimating a route from the wireless device 402 to a destination based on mapped boundaries and the received destination information and by estimating a proximity of the wireless device 402 to at least one geographical area along the estimated route. Further, the safety reporting component 424 may be configured to adjust the periodicity by determining a schedule for when the wireless device 402 is expected to be within a proximity threshold of the at least one geographical area based on the estimated proximity and by adjusting the periodicity for safety reporting based on the determined schedule. In another configuration, the safety reporting component 424 may be configured to adjust the safety reporting periodicity based on one or more of information related to a number of vehicles located within a distance of the geographical area, a time of day, or a time of year. In another configuration, the safety reporting component 424 may be configured to adjust the safety reporting periodicity by increasing the periodicity when the wireless device 402 is expected to be within a predetermined distance of a threshold number of vehicles and by decreasing the periodicity when the wireless device 402 is not expected to be within the predetermined distance of the threshold number of vehicles. In another configuration, the safety reporting component 424 may be configured to adjust the safety reporting periodicity by enabling or disabling the safety reporting based on the determined routing information. In another configuration, the safety reporting component 424 may be configured to provide a safety report based on the adjusted periodicity. The safety reporting component 424 may be configured to provide the safety report by sending the safety report. In another aspect, the safety reporting may include a DSRC report.

The various components of the wireless device 402 may be coupled together by a bus system 426. The bus system 426 may include a data bus, for example, as well as a power bus, a control signal bus, and a status signal bus in addition to the data bus. Components of the wireless device 402 may be coupled together or accept or provide inputs to each other using some other mechanism.

Although a number of separate components are illustrated in FIG. 4, one or more of the components may be combined or commonly implemented. For example, the processor 404 may be used to implement not only the functionality described above with respect to the processor 404, but also to implement the functionality described above with respect to the signal detector 418, the DSP 420, the user interface 422, and/or the safety reporting component 424. Further, each of the components illustrated in FIG. 4 may be implemented using a plurality of separate elements.

Figure 5:
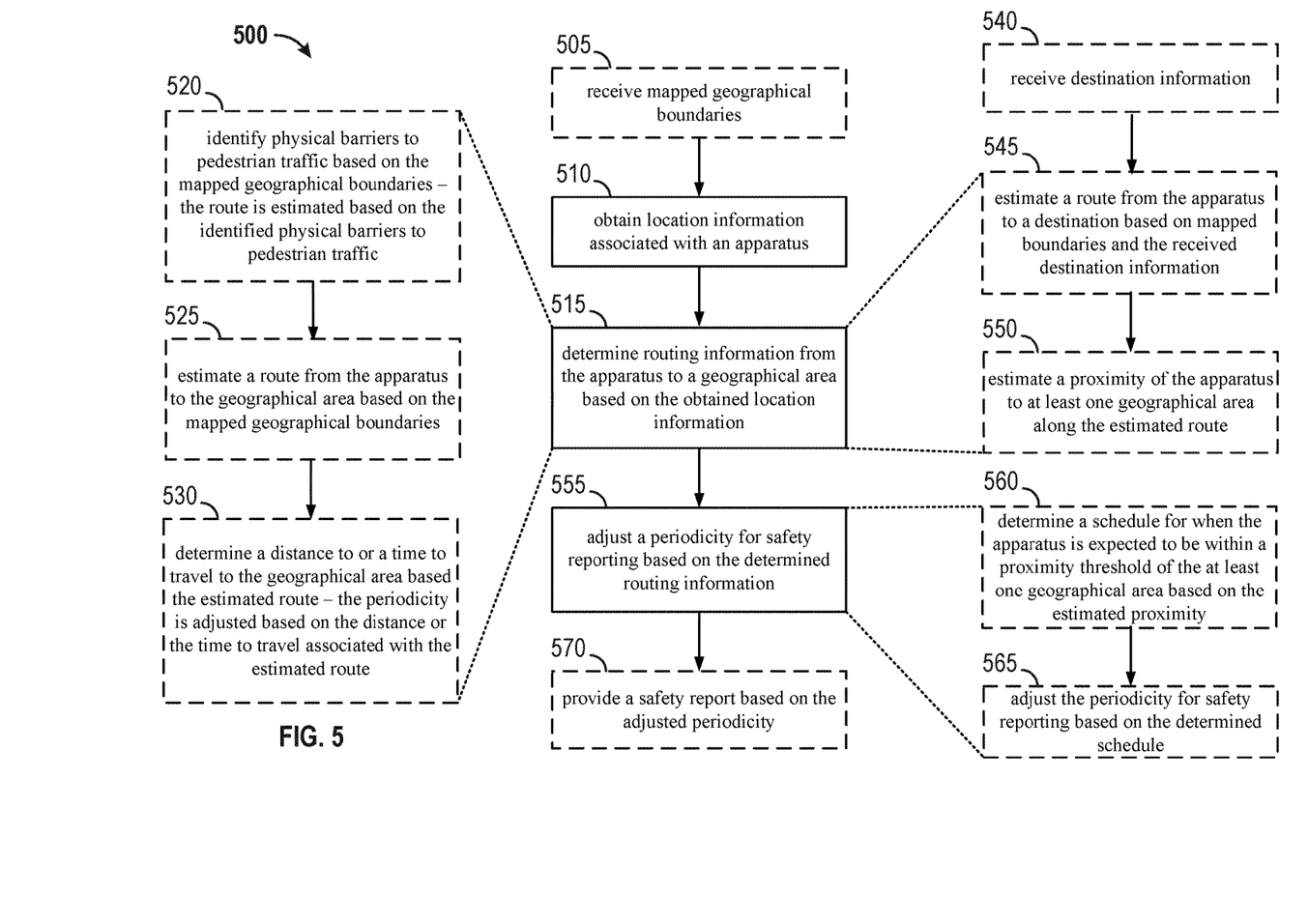
FIG. 5 is a flowchart of an exemplary method for adjusting a periodicity for safety message reporting.

FIG. 5 is a flowchart of an exemplary method 500 for adjusting a periodicity for safety message reporting. The method 500 may be performed using an apparatus (e.g., the STAs 114, 118, 302, and the wireless device 402, for example). Although the method 500 is described below with respect to the elements of wireless device 402 of FIG. 4, below, other components may be used to implement one or more of the steps described herein. Blocks with dotted lines indicate optional operations.

At block 505, the apparatus may receive mapped geographical boundaries. For example, referring to FIG. 3, the apparatus may be the STA 302. The STA 302 may receive a map of the surroundings, and the map may include mapped geographical boundaries including the mapped boundary 316 and others (e.g., other walls, fences, hills, etc.).

At block 510, the apparatus may obtain location information associated with the apparatus. For example, referring to FIG. 3, the STA 302 may obtain location information associated with the STA 302. The location information may include longitude and latitude coordinates. The location information may also include height information. In one configuration, the location information may be received from an AP, an eNodeB, or another STA. In another configuration, the STA 302 may be equipped with a GNSS component and may receive GNSS signals. The STA 302 may compute its location based on the received GNSS signals. In either configuration, the STA 302 may also include one or more accelerometers and other movement tracking components that enable the STA 302 to determine its location.

At block 515, the apparatus may determine routing information from the apparatus to a geographical area based on the obtained location information. In one configuration, the apparatus may determine the routing information by identifying physical barriers to pedestrian traffic based on the mapped geographical boundaries (at 520), by estimating a route from the apparatus to the geographical area based on the mapped geographical boundaries (at 525), and by determining a distance to or a time to travel to the geographical area based the estimated route. For example, referring to FIG. 3, the STA 302 may determine the routing information from the STA 302 to A street based on the location of the STA 302 being in the backyard of the user's home 318. The STA 302 may identify that the mapped boundary 316 is a physical barrier to pedestrian traffic based on the mapped geographical boundaries. The STA 302 may estimate the route from the STA 302 to A street based on the mapped boundary 316. The STA 302 may determine that the estimated route includes R9, R8, and R7. The STA 302 may determine the distance to A street based on the routes R9, R8, and R7 (as opposed to the absolute distance from the STA 302 to A street if there were no boundaries).

In another configuration, at 540, the apparatus may receive destination information from the user. In this configuration, the apparatus may determine the routing information from the apparatus to the geographical area by estimating a route from the apparatus to a destination based on mapped boundaries and the received destination information (at 545) and by estimating a proximity of the apparatus to at least one geographical area along the estimated route (at 550). For example, referring to FIG. 3, the STA 302 may receive user input that indicates destination information for the user's home 318. The STA 302 may determine the routing information from the current location to the user's home 318 by estimating a route based on the mapped boundaries (that may indicate streets and paths for vehicle traffic) and by estimating a proximity of the STA 302 to at least one geographical area (e.g., pedestrian path, street, or intersection) along the estimated route. In this example, the STA 302 may determine that the STA 302 will be within D street, the first intersection 310, A street, the second intersection 312, C street, the third intersection 314, and B street.

At block 555, the apparatus may adjust a periodicity for safety reporting based on the determined routing information. In one example, referring to FIG. 3, if the STA 302 determine the distance to or the time to travel to A street, then the STA 302 may determine whether the distance is above a distance threshold or whether the time to travel is above a time threshold. If either the distance or the time is above the respective threshold, then the STA 302 may not increase the reporting periodicity. In some aspects, the STA 302 may disable the reporting if the distance or time to travel is sufficiently high. In another aspects, if the distance or time to travel is below the respective threshold, then the STA 302 may enable the safety reporting and/or increase the reporting periodicity.

In another configuration, the apparatus may adjust the periodicity by determining a schedule for when the apparatus is expected to be within a proximity threshold of the at least one geographical area based on the estimated proximity (at 560) and by adjusting the periodicity based on the determined schedule (at 565). In an example, referring to FIG. 3, if the STA 302 estimates a route from the current location of the STA 302 to the user's home 318, then the STA 302 may determine a schedule for when the STA 302 is expected to be at the geographical areas that include D street, the first intersection 310, A street, the second intersection 312, C street, the third intersection 314, and B street. As such, the STA 302 may adjust the periodicity for safety reporting based on when the STA 302 is expected to be within or within a proximity of each of the geographical areas.

At 570, the apparatus may provide a safety report based on the adjusted periodicity. For example, referring to FIG. 3, the STA 302 may transmit the safety report based on the adjusted periodicity. The safety report may include one or more fields as indicated in FIG. 2. In an aspect, the safety report may be a basic safety message provided in accordance with a DSRC protocol.

Figure 6:
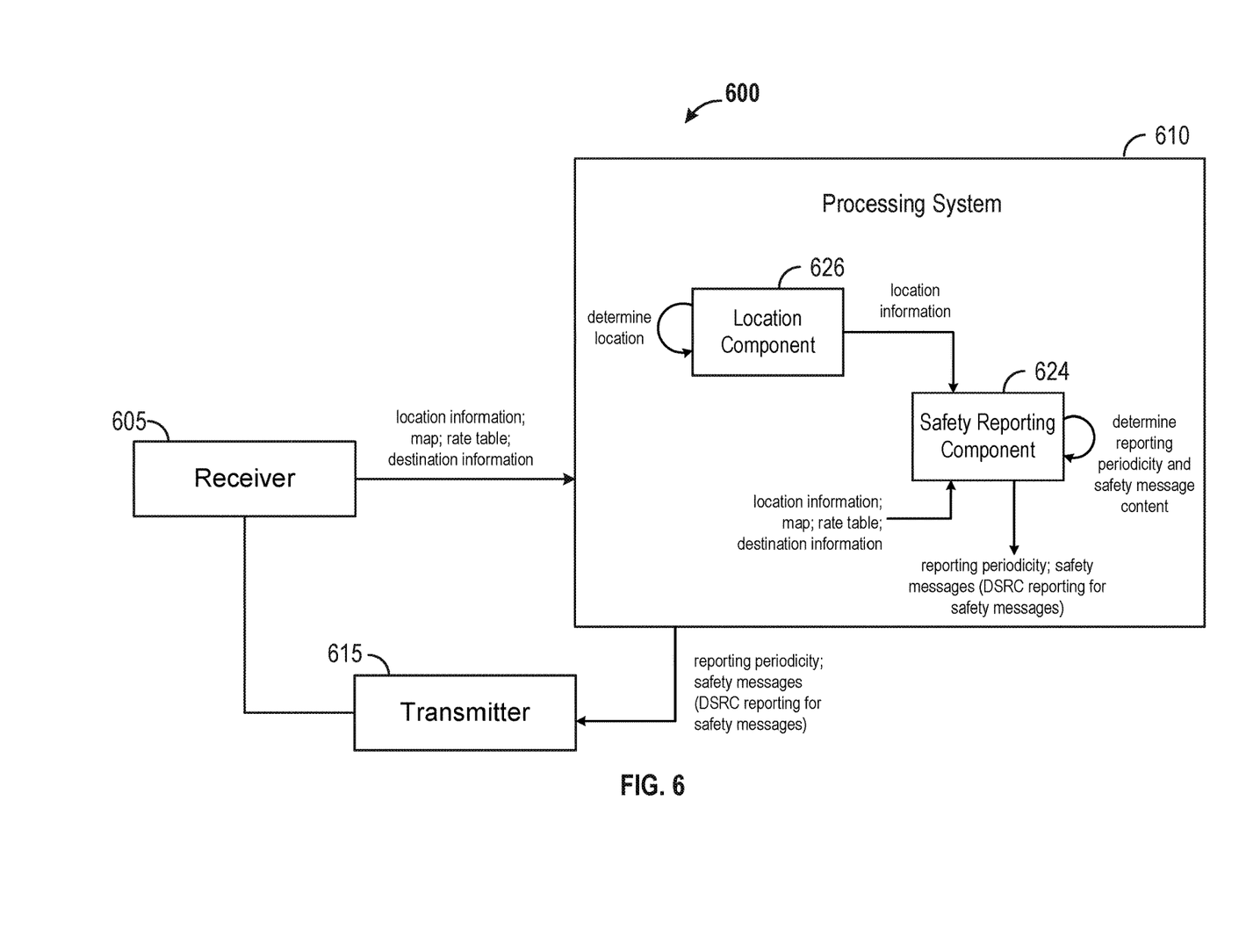
FIG. 6 is a functional block diagram of an example wireless communication device that adjusts a periodicity for safety message reporting.

FIG. 6 is a functional block diagram of an example wireless communication device 600 that adjusts a periodicity for safety message reporting. The wireless communication device 600 may include a receiver 605, a processing system 610, and a transmitter 615. The processing system 610 may include a safety reporting component 624. In an aspect, the processing system 610 may also include a location component 626.

The processing system 610, the safety reporting component 624, and/or the location component 626 may be configured to obtain location information associated with the wireless communication device 600. The processing system 610 and/or the safety reporting component 624 may be configured to determine routing information from the wireless communication device 600 to a geographical area based on the obtained location information. The processing system 610 and/or the safety reporting component 624 may be configured to adjust a periodicity for safety reporting based on the determined routing information. In an aspect, the geographical area may be a vehicular road, a parking lot, a bicycle path, a pedestrian path, a park, an intersection, or a building. In one configuration, the processing system 610 and/or the safety reporting component 624 may be configured to determine the routing information by estimating a route from the wireless communication device 600 to the geographical area based on mapped geographical boundaries and by determining a distance to or a time to travel to the geographical area based the estimated route. In this configuration, the periodicity may be adjusted based on the distance associated with the estimated route or the time to travel associated with the estimated route. In another configuration, the processing system 610 and/or the safety reporting component 624 may be configured to determine the routing information by identifying physical barriers to pedestrian traffic based on the mapped geographical boundaries. The route may be estimated based on the identified physical barriers to pedestrian traffic, and the periodicity may be adjusted based on the identified physical barriers to pedestrian traffic. In another configuration, the receiver 605, processing system 610, and/or the safety reporting component 624 may be configured to receive the mapped geographical boundaries from another apparatus. In another configuration, the receiver 605, the processing system 610, and/or the safety reporting component 624 may be configured to receive destination information. In this configuration, the processing system 610 and/or the safety reporting component 624 may be configured to determine the routing information by estimating a route from the wireless communication device 600 to a destination based on mapped boundaries and the received destination information and by estimating a proximity of the wireless communication device 600 to at least one geographical area along the estimated route. Further, the processing system 610 and/or the safety reporting component 624 may be configured to adjust the periodicity by determining a schedule for when the wireless communication device 600 is expected to be within a proximity threshold of the at least one geographical area based on the estimated proximity and by adjusting the periodicity for safety reporting based on the determined schedule. In another configuration, the processing system 610 and/or the safety reporting component 624 may be configured to adjust the safety reporting periodicity based on one or more of information related to a number of vehicles located within a distance of the geographical area, a time of day, or a time of year. In another configuration, the processing system 610 and/or the safety reporting component 624 may be configured to adjust the safety reporting periodicity by increasing the periodicity when the wireless communication device 600 is expected to be within a predetermined distance of a threshold number of vehicles and by decreasing the periodicity when the wireless communication device 600 is not expected to be within the predetermined distance of the threshold number of vehicles. In another configuration, the processing system 610 and/or the safety reporting component 624 may be configured to adjust the safety reporting periodicity by enabling or disabling the safety reporting based on the determined routing information. In another configuration, the processing system 610 and/or the safety reporting component 624 may be configured to provide a safety report based on the adjusted periodicity. The transmitter 615, the processing system 610, and/or the safety reporting component 624 may be configured to provide the safety report by sending the safety report. In another aspect, the safety reporting may include a DSRC report.

The receiver 605, the processing system 610, the safety reporting component 624, and/or the transmitter 615 may be configured to perform one or more functions discussed above with respect to blocks 505, 510, 515, 520, 525, 530, 540, 545, 550, 555, 560, 565, and 570 of FIG. 5. The receiver 605 may correspond to the receiver 412. The processing system 610 may correspond to the processor 404. The transmitter 615 may correspond to the transmitter 410. The safety reporting component 624 may correspond to the safety reporting component 124, and/or the safety reporting component 424.

In one configuration, the wireless communication device 600 may include means for obtaining location information associated with the wireless communication device 600. The wireless communication device 600 may include means for determining routing information from the wireless communication device 600 to a geographical area based on the obtained location information. The wireless communication device 600 may include means for adjusting a periodicity for safety reporting based on the determined routing information. In an aspect, the geographical area may be a vehicular road, a parking lot, a bicycle path, a pedestrian path, a park, an intersection, or a building. In one configuration, the means for determining the routing information may be configured to estimate a route from the wireless communication device 600 to the geographical area based on mapped geographical boundaries and to determine a distance to or a time to travel to the geographical area based the estimated route. In this configuration, the periodicity may be adjusted based on the distance associated with the estimated route or the time to travel associated with the estimated route. In another configuration, the means for determining the routing information may be configured to identify physical barriers to pedestrian traffic based on the mapped geographical boundaries. The route may be estimated based on the identified physical barriers to pedestrian traffic, and the periodicity may be adjusted based on the identified physical barriers to pedestrian traffic. In another configuration, the wireless communication device 600 may include means for receiving the mapped geographical boundaries from another apparatus. In another configuration, the wireless communication device 600 may be configured to receiving destination information. In this configuration, the means for determining the routing information may be configured to estimate a route from the wireless communication device 600 to a destination based on mapped boundaries and the received destination information and to estimate a proximity of the wireless communication device 600 to at least one geographical area along the estimated route. Further, the means for adjusting the periodicity may be configured to determine a schedule for when the wireless communication device 600 is expected to be within a proximity threshold of the at least one geographical area based on the estimated proximity and to adjust the periodicity for safety reporting based on the determined schedule. In another configuration, the safety reporting periodicity may be adjusted based on one or more of information related to a number of vehicles located within a distance of the geographical area, a time of day, or a time of year. In another configuration, the means for adjusting the safety reporting periodicity may be configured to increase the periodicity when the wireless communication device 600 is expected to be within a predetermined distance of a threshold number of vehicles and to decrease the periodicity when the wireless communication device 600 is not expected to be within the predetermined distance of the threshold number of vehicles. In another configuration, the means for adjusting the safety reporting periodicity may be configured to enable or disable the safety reporting based on the determined routing information. In another configuration, the wireless communication device 600 may include means for providing a safety report based on the adjusted periodicity. In another aspect, the safety reporting may include a DSRC report.

For example, means for obtaining location information may include the receiver 605, the location component 626, the processing system 610, and/or the safety reporting component 624. Means for determining routing information may include the processing system 610 and/or the safety reporting component 624. Means for adjusting a periodicity for safety reporting may include the processing system 610 and/or the safety reporting component 624. Means for receiving the destination information may include the receiver 605, the processing system 610, and/or the safety reporting component 624.

The various operations of methods described above may be performed by any suitable means capable of performing the operations, such as various hardware and/or software component(s), circuits, and/or component(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, a FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In an aspect, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus for wireless communications, comprising:
   a processing system configured to:
      obtain location information associated with the apparatus;
      determine routing information from the apparatus to a geographical area based on the obtained location information; and
      adjust a periodicity of safety reporting based on the determined routing information;
   wherein the processing system is configured to determine the routing information by:
      estimating the route from the apparatus to the geographical area based on mapped geographical boundaries; and
      determining a distance to or a time to travel to the geographical area based the estimated route, wherein the periodicity is adjusted based on the distance associated with the estimated route or the time to travel associated with the estimated route;
   wherein the processing system is configured to adjust the periodicity by:
      determining a schedule for when the apparatus is expected to be within a proximity threshold of the geographical area based on an estimated proximity of the apparatus to the geographical area along an estimated route from the apparatus to the geographical area; and
      adjusting the periodicity of safety reporting based on the determined schedule.

2. The apparatus of claim 1, wherein the geographical area is a vehicular road, a parking lot, a bicycle path, a pedestrian path, a park, an intersection, or a building.

3. The apparatus of claim 1, wherein the processing system is further configured to determine the routing information by:
   identifying physical barriers to pedestrian traffic based on the mapped geographical boundaries, wherein the route is estimated based on the identified physical barriers to pedestrian traffic, and wherein the periodicity is adjusted based on the identified physical barriers to pedestrian traffic.

4. The apparatus of claim 1, wherein the processing system is configured to receive the mapped geographical boundaries from another apparatus.

5. The apparatus of claim 1, wherein the processing system is further configured to receive destination information, wherein the processing system is configured to determine the routing information by:
   estimating a second route from the apparatus to a destination based on mapped boundaries and the received destination information; and
   estimating a proximity of the apparatus to the geographical area; wherein the geographical area is along the estimated second route.

6. The apparatus of claim 1, wherein the processing system is further configured to adjust the periodicity of safety reporting based on one or more of information related to a number of vehicles located within a distance of the geographical area, a time of day, or a time of year.

7. The apparatus of claim 1, wherein the processing system is further configured to adjust the periodicity of safety reporting by increasing the periodicity when the apparatus is expected to be within a predetermined distance of a threshold number of vehicles and by decreasing the periodicity when the apparatus is not expected to be within the predetermined distance of the threshold number of vehicles.

8. The apparatus of claim 1, wherein the processing system is further configured to adjust the periodicity of safety reporting by enabling or disabling the safety reporting based on the determined routing information.

9. The apparatus of claim 1, wherein the processing system is further configured to provide a safety report based on the adjusted periodicity.

10. The apparatus of claim 1, wherein the safety reporting includes a dedicated short range communications (DSRC) report.

11. A method of wireless communication by an apparatus, comprising:
  obtaining location information associated with the apparatus;
  determining routing information from the apparatus to a geographical area based on the obtained location information; and
  adjusting a periodicity of safety reporting based on the determined routing information;
  wherein the determining the routing information comprises:
    estimating the route from the apparatus to the geographical area based on mapped geographical boundaries; and
    determining a distance to or a time to travel to the geographical area based the estimated route, wherein the periodicity is adjusted based on the distance associated with the estimated route or the time to travel associated with the estimated route;
  wherein the adjusting the periodicity comprises:
    determining a schedule for when the apparatus is expected to be within a proximity threshold of the geographical area based on an estimated proximity of the apparatus to the geographical area along an estimated route from the apparatus to the geographical area; and
    adjusting the periodicity of safety reporting based on the determined schedule.

12. The method of claim 11, wherein the geographical area is a vehicular road, a parking lot, a bicycle path, a pedestrian path, a park, an intersection, or a building.

13. The method of claim 11, wherein the determining the routing information comprises:
  identifying physical barriers to pedestrian traffic based on the mapped geographical boundaries, wherein the route is estimated based on the identified physical barriers to pedestrian traffic, and wherein the periodicity is adjusted based on the identified physical barriers to pedestrian traffic.

14. The method of claim 11, further comprising receiving the mapped geographical boundaries from another apparatus.

15. The method of claim 11, further comprising receiving destination information, wherein the determining the routing information comprises:
  estimating a second route from the apparatus to a destination based on mapped boundaries and the received destination information; and
  estimating a proximity of the apparatus to the geographical area; wherein the geographical area is along the estimated second route.

16. The method of claim 11, wherein the periodicity of safety reporting is further adjusted based on one or more of information related to a number of vehicles located within a distance of the geographical area, a time of day, or a time of year.

17. The method of claim 11, wherein the adjusting the periodicity of safety reporting further comprises:
  increasing the periodicity when the apparatus is expected to be within a predetermined distance of a threshold number of vehicles; and
  decreasing the periodicity when the apparatus is not expected to be within the predetermined distance of the threshold number of vehicles.

18. The method of claim 11, wherein the adjusting the periodicity of safety reporting further comprises enabling or disabling the safety reporting based on the determined routing information.

19. The method of claim 11, further comprising providing a safety report based on the adjusted periodicity.

20. The method of claim 11, wherein the safety reporting includes a dedicated short range communications (DSRC) report.

21. An apparatus for wireless communication, comprising:
  means for obtaining location information associated with the apparatus;
  means for determining routing information from the apparatus to a geographical area based on the obtained location information; and
  means for adjusting a periodicity of safety reporting based on the determined routing information;
  wherein the means for determining the routing information is configured to:
    estimate the route from the apparatus to the geographical area based on mapped geographical boundaries; and
    determine a distance to or a time to travel to the geographical area based the estimated route, wherein the periodicity is adjusted based on the distance associated with the estimated route or the time to travel associated with the estimated route;
  wherein the means for adjusting the periodicity is configured to:
    determine a schedule for when the apparatus is expected to be within a proximity threshold of the geographical area based on an estimated proximity of the apparatus to the geographical area along an estimated route from the apparatus to the geographical area; and
    adjust the periodicity of safety reporting based on the determined schedule.

22. The apparatus of claim 21, wherein the means for determining the routing information is configured to:
  identify physical barriers to pedestrian traffic based on the mapped geographical boundaries, wherein the route is estimated based on the identified physical barriers to pedestrian traffic, and wherein the periodicity is adjusted based on the identified physical barriers to pedestrian traffic.

23. The apparatus of claim 21, further comprising means for receiving the mapped geographical boundaries from another apparatus.

24. The apparatus of claim 21, further comprising means for receiving destination information, wherein the means for determining the routing information is configured to:
  estimate a second route from the apparatus to a destination based on mapped boundaries and the received destination information; and
  estimate a proximity of the apparatus to the geographical area; wherein the geographical area is along the estimated second route.

25. The apparatus of claim 21, wherein the periodicity of safety reporting is further adjusted based on one or more of information related to a number of vehicles located within a distance of the geographical area, a time of day, or a time of year.

26. The apparatus of claim 21, further comprising providing a safety report based on the adjusted periodicity.

27. A non-transitory computer-readable storage medium of an apparatus storing computer executable code, comprising code to:
  obtain location information associated with the apparatus;
  determine routing information from the apparatus to a geographical area based on the obtained location information; and
  adjust a periodicity of safety reporting based on the determined routing information;
  wherein the non-transitory computer-readable storage medium further comprising code to:
    estimating the route from the apparatus to the geographical area based on mapped geographical boundaries; and
    determining a distance to or a time to travel to the geographical area based the estimated route, wherein the periodicity is adjusted based on the distance associated with the estimated route or the time to travel associated with the estimated route;
  wherein the non-transitory computer-readable storage medium further comprising code to:
    determine a schedule for when the apparatus is expected to be within a proximity threshold of the geographical area based on an estimated proximity of the apparatus to the geographical area along an estimated route from the apparatus to the geographical area; and
    adjust the periodicity of safety reporting based on the determined schedule.

* * * * *